United States Patent
Beinschob et al.

(10) Patent No.: US 10,585,162 B2
(45) Date of Patent: Mar. 10, 2020

(54) POSITION DETERMINATION APPARATUS

(71) Applicant: SICK AG, Waldkirch/Breisgau (DE)

(72) Inventors: Patric Beinschob, Hamburg (DE); Christian Rapp, Hamburg (DE)

(73) Assignee: SICK AG, Waldkirch/Breisgau (DE)

( * ) Notice: Subject to any disclaimer, the term of this patent is extended or adjusted under 35 U.S.C. 154(b) by 166 days.

(21) Appl. No.: 15/588,322

(22) Filed: May 5, 2017

(65) Prior Publication Data
US 2017/0328977 A1   Nov. 16, 2017

(30) Foreign Application Priority Data

May 10, 2016 (DE) .................. 10 2016 108 642

(51) Int. Cl.
| | |
|---|---|
| *G01S 5/02* | (2010.01) |
| *G01S 13/75* | (2006.01) |
| *G01S 17/42* | (2006.01) |
| *G01S 13/50* | (2006.01) |
| *G01S 13/86* | (2006.01) |
| *G06K 7/10* | (2006.01) |

(52) U.S. Cl.
CPC .............. *G01S 5/0289* (2013.01); *G01S 5/02* (2013.01); *G01S 5/0263* (2013.01); *G01S 13/50* (2013.01); *G01S 13/75* (2013.01); *G01S 13/865* (2013.01); *G01S 17/42* (2013.01); *G06K 7/10366* (2013.01)

(58) Field of Classification Search
CPC combination set(s) only.
See application file for complete search history.

(56) References Cited

U.S. PATENT DOCUMENTS

| | | |
|---|---|---|
| 2013/0060520 A1 | 3/2013 | Amor et al. |
| 2014/0031980 A1 | 1/2014 | Gutmann et al. |
| 2016/0025498 A1* | 1/2016 | Le Grand .............. G01C 21/12 |
| | | 701/469 |

FOREIGN PATENT DOCUMENTS

EP    2 927 838 B1    3/2016

OTHER PUBLICATIONS

Lavigne, N. James, Joshua A. Marshall, and Unal Artan. "Towards underground mine drift mapping with RFID." In Electrical and Computer Engineering (CCECE), 2010 23rd Canadian Conference on, pp. 1-6. IEEE, 2010.*
Vorst, Philipp, and Andreas Zell. "Fully autonomous trajectory estimation with long-range passive RFID." In Robotics and Automation (ICRA), 2010 IEEE International Conference on, pp. 1867-1872. IEEE, 2010.*

(Continued)

*Primary Examiner* — Zhitong Chen
(74) *Attorney, Agent, or Firm* — Nath, Goldberg & Meyer; Jerald L. Meyer; Stanley N. Protigal

(57) ABSTRACT

The present invention relates to a position determination apparatus for the position determination of at least one RFID tag, comprising an RFID reader and a control device, wherein the control device is configured to transmit a radio signal by means of the RFID reader, said radio signal exciting an RFID tag to transmit a response signal. The position determination apparatus is movable to different locations from an original position and the control device is configured to transmit a respective radio signal at at least two different locations and to receive the respective response signal or the respective response signals.

19 Claims, 1 Drawing Sheet

(56) References Cited

OTHER PUBLICATIONS

Grisetti, et al., "A Tutorial on Graph-Based SLAM", Department of Computer Science, University of Freiburg, 2010.
Kleiner, et al., "RFID Technology-based Exploration and SLAM for Search and Rescue", Linkoping University Post Print, University of Freiburg, 2006.
Lavigne, et al., "Towards Underground Mine Drift Mapping with RFID", Electrical and Computer Engineering (CCECE), 2010 23rd Canadian Conference.
Vorst, et al., "Fully Autonomous Trajectory Estimation with Long-Range Passive RFID", Robotics and Automation (ICRA), 2010 IEEE International Conference.
Official Communication dated Jan. 12, 2017 issued in corresponding German Application No. 10 2016 108 642.8.

* cited by examiner

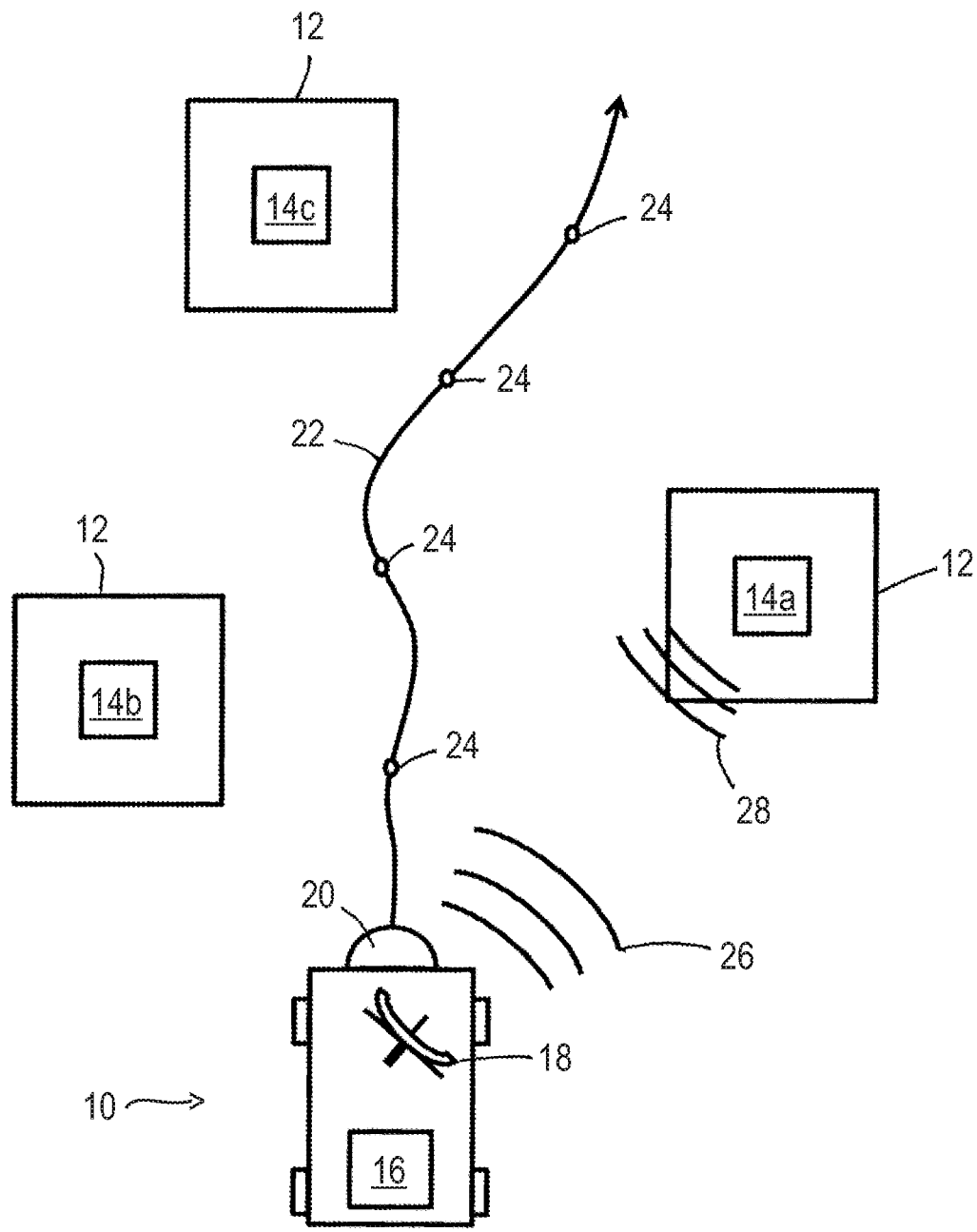

POSITION DETERMINATION APPARATUS

FIELD

The invention relates to a position determination apparatus for the position determination of at least one RFID tag, comprising an RFID reader and a control device, wherein the control device is configured to transmit a radio signal by means of the RFID reader, said radio signal exciting an RFID tag to transmit a response signal.

BACKGROUND

Apparatus for reading RFID tags are generally known and serve, for example, to identify articles provided with the RFID tags.

Products can in particular be marked with RFID tags to identify and localize the products. The spatial detection of products marked with RFID tags frequently takes place by means of fixed-position reading gates. These reading gates can be arranged, for example, at entrances and exits of warehouses.

It is disadvantageous with such reading gates that the stock in a warehouse can admittedly be determined. However, the exact position of the respective products (or of the RFID tag identifying the products) inside the warehouse is unknown.

The problem additionally arises in the position determination of RFID tags that an exact localization of the RFID tag is only possible with difficulty in the reception range of the RFID reader. In addition, passive RFID tags are often used for cost reasons that can only transmit a response signal in response to a radio signal (or generally to an excitation signal) of the RFID reader. The time behavior between the radio signal and the response signal can in this respect not be described more accurately so that passive RFID tags cannot e.g. be used for time-of-flight measurements (signal transit time measurements) for a distance measurement.

It is therefore the underlying object of the invention to provide a position determination apparatus that makes it possible to detect passive RFID tags and to determine the positions of the RFID tag.

SUMMARY

This object is satisfied by a position determination apparatus in accordance with claim 1 and in particular in that the position determination apparatus is movable from an original position to different locations and in that the control device is configured to transmit a respective radio signal at at least two different locations and to receive the respective response signal or the respective response signals; and to determine a relative position and a relative alignment of the position determination apparatus with respect to the original position and to determine a relative position of the RFID tag with respect to the original position with reference to a distance of the at least two different locations and with reference to the response signals that were excited by the radio signals.

The invention makes use of the recognition that different response signals of a respective RFID tag can be received by a movement of the apparatus and by the exciting of the RFID tag from different positions, wherein a conclusion can be drawn on a relative position of the RFID tag relative to the position determination apparatus with reference to the response signals. The alignment of the position determination signal can thus also be determined with reference to the relative position and to the movement of the position determination apparatus.

In this respect, both the position of the apparatus and the position of the RFID tag are initially unknown. The initial position of the position determination apparatus can in this respect be defined as the original position.

The response signals can, for example, differ in their direction and/or in their strength such that the relative position of the RFID tag can be determined from the response signals.

A respective RFID tag can transmit an identification in the response signal that makes it possible to associate respective different response signals with the same (i.e. the correct) RFID tag. The identification can be permanently stored in the RFID tag. A position of the RFID tag is in particular not contained in the response signal.

RFID (radio frequency identification) is to be understood as a technology for contactless identification of objects by means of radio waves. The RFID reader can generate a radio signal, i.e. in particular an electromagnetic field, for the identification of the RFID tag. The RFID tag is exposed to this radio signal and takes energy from the radio signal to transmit the response signal. The at least one RFID tag can be a passive RFID tag.

The radio signal and the response signal can substantially have the same frequency. The frequency used can in particular lie in the range between 125 kHz and 875 kHz, in the range of 13.56 MHz, in the range of 865 to 869 MHz or in the range of 950 MHz. The frequency can also be established in the range of 2.45 GHz and 5.8 GHz.

A position determination of a plurality of RFID tags can also be carried out using the position determination apparatus in accordance with the invention. In this respect, a radio signal is transmitted by means of the RFID reader that excites the plurality of RFID tags to transmit a respective response signal. In addition, the position determination apparatus is moved from an original position to different locations, wherein a respective radio signal is transmitted to the plurality of RFID tags at at least two different locations and the respective response signals of the respective RFID tags are received. Relative positions and a respective relative alignment of the position determination apparatus with respect to the original position and relative positions of the plurality of RFID tags with respect to the original position can subsequently be determined with reference to a distance of the at least two different locations and with reference to the response signals that were excited by the radio signals that were transmitted from different locations.

The position determination apparatus can, for example, be an automated guide vehicle (AGV), a flying drone, but also a vehicle operated by a person such as a fork-lift truck.

In the case of an AGV or of a drone, the detection of the RFID tag can take place completely automatically in that the position determination apparatus navigates automatically.

Advantageous further developments of the invention can be seen from the description, from the drawing and from the dependent claims.

In accordance with a first advantageous embodiment, the position determination apparatus comprises a movement determination apparatus, in particular a laser scanner and/or an odometer. The movement determination apparatus serves for the measurement of the position determination apparatus' own movement. For this purpose, the laser scanner can, for example, repeatedly determine distances from different objects in the environment, wherein the movement of the position determination apparatus can be determined with reference to distance changes. Alternatively or additionally, the movement of the position determination apparatus can be measured by means of an odometer that e.g. detects revolutions of a wheel of the position determination apparatus. Instead of or in addition to the odometer and/or to the laser scanner, an ultrasound sensor system, a radar distance sensor system, an inductive proximity sensor system, a unit for radio localization and/or an inertial measurement unit (IMU) can also be encompassed in the movement determination apparatus for this purpose. The movement determination apparatus can preferably also comprise a compass and/or a gyroscope and the like to determine an alignment of the position determination apparatus.

The control unit preferably uses the measured movement of the position determination apparatus for calculating the relative position. The distance or a directional vector between two different locations can, for example, be known by the measurement of the movement, at which locations the position determination apparatus has transmitted a respective radio signal. The position of the RFID tag can then be determined by means of triangulation, for example.

In accordance with a further advantageous embodiment, the position determination apparatus comprises a distance determination device, in particular a laser scanner, that determines distances from objects in the environment of the position determination apparatus. The distance determination device can serve to prevent a collision of the position determination apparatus with objects. If, for example, a laser scanner is used as the distance determination device, the same laser scanner can also serve as a movement determination apparatus. A validation of a determined relative position can take place using measurement data of the distance determination device. If no object is present at the determined position of an RFID tag, a respective calculation of the relative position can be discarded. On the other hand, the presence of an object at a determined position of an RFID tag can confirm the determined position.

The RFID reader can be configured to output radio signals in different, restricted spatial directions and to receive response signals from different, restricted spatial directions. In this manner, the direction of the response signal can be determined so that the relative position can be determined in a simpler manner. The RFID reader is, for example, pivotably and/or movably attached to the position determination apparatus. Alternatively, a radiation in different, restricted spatial directions and/or a reception from different, restricted spatial directions can also be achieved by a plurality of suitably connected antennas.

The RFID reader preferably comprises an antenna having a directionality. This means that the antenna has a predetermined antenna gain. Due to the directionality, the direction in which the radio signal is transmitted and from which the response signal is received can be determined more exactly. Alternatively or additionally, an omnidirectional antenna can also be used.

The control device is particularly preferably configured to prepare a simultaneous localization and mapping problem (SLAM problem) from a movement of the position determination apparatus and from the response signals and to solve the simultaneous localization and mapping problem to determine the relative position and the relative alignment of the position determination apparatus and to determine the relative position of the RFID tag with respect to the original position.

A SLAM problem is understood in the present case as a problem in which initially both the position and the alignment of the position determination apparatus and the position of the RFID tag are unknown. When solving the SLAM problem, the position and alignment of the position determination apparatus and the position of the RFID tag are determined simultaneously.

In accordance with a further advantageous embodiment, the control device is configured to solve the simultaneous localization and mapping problem using a graph-based method. With such a graph-based method, nodes of the graph can correspond to the alignment (i.e. the so-called pose) of the position determination apparatus. The nodes can be connected by edges, with the edges indicating restrictions in the alignment of the position determination apparatus.

Alternatively or additionally, Kalman filters, particulate filters and/or information filters can also be used for solving the simultaneous localization and mapping problem. The SLAM problem is preferably an online SLAM problem that is varied incrementally on the basis of new response signals.

In accordance with a further advantageous embodiment, the control devise is configured to prepare a map that shows the position of the at least one RFID tag and preferably of objects in the environment of the position determination apparatus, with the map being used in the navigation of the position determination apparatus. The map can be respectively further complemented on movements of the position determination apparatus.

Data of the distance determination apparatus and of the movement determination apparatus and the determined relative positions with respect to the RFID tags (i.e. the RFID tags themselves) can be entered into the map, for example. The control device can navigate the position determination apparatus such that the position determination apparatus keeps a respective sufficient distance from all the objects (e.g. walls) and RFID tags entered in the map.

In accordance with a further advantageous embodiment, the position determination apparatus moves autonomously and the control device is configured to move the position determination apparatus to the at least two different locations. As mentioned, the position determination apparatus can, for example, be an automated guided vehicle (AGV) or a flying drone. The control device can be configured in this respect to navigate the position determination apparatus independently to different locations.

A further subject of the invention is a method for the position determination of at least one RFID tag, wherein a radio signal is transmitted by means of an RFID reader, said radio signal exciting at least one RFID tag to transmit a response signal. The method is characterized in that a position determination apparatus carrying the RFID reader is moved to different locations;

a respective radio signal is transmitted at at least two different locations and the respective response signal or the respective response signals is/are received; and a relative position and a relative alignment of the position determination apparatus with respect to the RFID tag are determined with reference to the response signals.

The statements made on the position determination apparatus in accordance with the invention, in particular with respect to advantages and preferred embodiments, apply accordingly to the method in accordance with the invention.

In accordance with an advantageous embodiment of the method in accordance with the invention, a measurement of the movement of the position determination apparatus is carried out by means of a movement determination apparatus. The movement determination apparatus can thus determine the position determination apparatus' own movement. The movement determination apparatus can comprise a laser scanner and/or an odometer.

BRIEF DESCRIPTION OF THE DRAWINGS

The invention will be described in the following purely by way of example with reference to the drawing. There is shown:

FIG. 1 a position determination apparatus that moves in the proximity of a plurality of RFID tags.

DETAILED DESCRIPTION

FIG. 1 shows a position determination apparatus in the form of an automated guide vehicle 10 that is located in the vicinity of three objects 12. The objects 12 can, for example, be products in a warehouse. The objects 12 are provided with a first RFID tag 14a, with a second RFID tag 14b and with a third RFID tag 14c, with a respective object 12 having an RFID tag 14.

The automated guide vehicle 10 comprises a control device 16, an RFID reader 18 having a directional antenna and a laser scanner 20. A respective pivot position of the directional antenna is known to the control device 16 in this respect. The laser scanner 20 serves both to detect movements of the automated guide vehicle 10 and to measure distances from the objects 12. The laser scanner 20 thus serves as a movement determination apparatus and as a distance determination device.

The automated guide vehicle 10 moves along a travel route 22 between the objects 12, whereby the position of the automated guide vehicle 10 shown in FIG. 1 corresponds to an original position. A plurality of measurement points 24 are located on the travel route 22. The original position shown is also a measurement point 24.

The procedure at a respective measurement point 24 will be described by way of example in the following. A radio signal 26 is transmitted into a first spatial direction by means of the RFID reader 18. The first RFID tag 14a is located in the first spatial direction. The first RFID tag 14a is excited by the radio signal 26 to transmit a response signal 28 that is received by the RFID reader.

Radio signals 26 are subsequently repeatedly transmitted in different further spatial directions to obtain a response signal 28 from all RFID tags 14. The automated guide vehicle 10 then moves on to the next measurement point 24 and the transmission of the radio signals 26 in different spatial directions is repeated. The control device 16 prepares a simultaneous localization and mapping problem (SLAM problem) with reference to the response signals 28 received at a plurality of measurement points 24 and with reference to the movement of the automated guide vehicle 10 and solves it e.g. by means of graph-based fs.

The relative positions of the RFID tags 14 hereby determined and the alignment of the automated guide vehicle 10 are entered in a map that is stored in the control device 16. The map is optionally used for adapting the travel route 22 and serves to represent the positions of the objects 12.

The map can be transmitted to a product management system (not shown) and can serve to locate the products marked with the RFID tags 14 faster.

The term "automated guide vehicle" (AGV) used in this text in particular also comprises driverless transport systems (DTS).

REFERENCE NUMERAL LIST 10 automated guide vehicle
12 object
14a, 14b, 14c RFID tag
16 control device
18 RFID reader
20 laser scanner
22 travel route
24 measurement point
26 radio signal
28 response signal

The invention claimed is:

1. A position determination apparatus for the position determination of at least one RFID tag, the position determination apparatus comprising,
    an RFID reader and a control device, the RFID reader configured to output radio signals in different, restricted spatial directions and to receive response signals from different, restricted spatial directions,
    wherein the control device is configured to transmit a radio signal by means of the RFID reader, said radio signal exciting at least one RFID tag to transmit a response signal,
    wherein the position determination apparatus is movable from an original position to different locations and the control device is furthermore configured:
        to transmit a respective radio signal at at least two different locations and to receive the respective response signal or the respective response signals;
        to determine, as a simultaneous localization and mapping problem (SLAM problem) with reference to the response signals, a relative position and a relative alignment of the position determination apparatus with respect to the original position and to determine a relative position of the RFID tag with respect to the original position by means of a distance of the at least two different locations and by means of the response signals that were excited by the radio signals that were transmitted from the at least two different locations, whereby transmission of a radio signal into a first spatial direction results in excitation of an RFID tag located in the first spatial direction, and receiving response signals from the RFID tag from that spatial direction, and transmission of a radio signal into a second spatial direction results in excitation of an RFID tag located in the second spatial direction, and receiving response signals from the RFID tag from that spatial direction; and
        to cause the position determination device to move to a next location and determine a subsequent relative position and relative alignment of the position determination apparatus with respect to said next location,
    the RFID reader configured to output radio signals in different, restricted spatial directions and receive response signals from different, restricted spatial directions, controlled by a movable antenna or by using a plurality of suitably connected antennas, allowing determination of the direction of the response signal and so as to determine the relative position.

2. The position determination apparatus in accordance with claim 1,
    further comprising a movement determination apparatus that serves for the measurement of the movement of the position determination apparatus.

3. The position determination apparatus in accordance with claim 2,
    wherein the movement determination apparatus is selected from the group of members consisting of a laser scanner, an ultrasound sensor system, a radar distance sensor system, an odometer and combinations of the foregoing.

4. The position determination apparatus in accordance with claim 2,
wherein the control apparatus is configured to use the measured movement of the position determination apparatus for calculating the relative position.

5. The position determination apparatus in accordance with claim 1,
further comprising a distance determination device that determines distances from objects in the environment of the position determination apparatus.

6. The position determination apparatus in accordance with claim 5,
wherein the distance determination device is a laser scanner.

7. The position determination apparatus in accordance with claim 1,
wherein the RFID reader is configured to output radio signals in different, restricted spatial directions and to receive response signals from different, restricted spatial directions by pivoting and/or moving the position determination apparatus or pivoting and/or moving an antenna attached to the position determination apparatus.

8. The position determination apparatus in accordance with claim 7,
wherein the RFID reader comprises an antenna having a directionality.

9. The position determination apparatus in accordance with claim 1,
wherein the control device is configured to prepare a simultaneous localization and mapping problem from a movement of the position determination apparatus and from the response signals and to solve the simultaneous localization and mapping problem to determine the relative position and the relative alignment of the position determination apparatus and to determine the relative position of the RFID tags with respect to the original position.

10. The position determination apparatus in accordance with claim 9,
wherein the control device is configured to solve the simultaneous localization and mapping problem using a graph-based method.

11. The position determination apparatus in accordance with claim 1,
wherein the control device is configured to prepare a map that shows the position of the at least one RFID tag, with the map being used in the navigation of the position determination apparatus.

12. The position determination apparatus in accordance with claim 11,
wherein the control device is configured to prepare the map such that it also shows the position of objects in the environment of the position determination apparatus.

13. The position determination apparatus in accordance with claim 1,
wherein the position determination apparatus moves autonomously and the control device is configured to move the position determination apparatus to the at least two different locations.

14. The position determination apparatus in accordance with claim 1,
wherein the RFID reader is configured to output radio signals in different, restricted spatial directions and to receive response signals from different, restricted spatial directions by pivoting and/or moving an antenna attached to the position determination apparatus.

15. A method for the position determination of at least one RFID tag, the method comprising the steps of:
transmitting a radio signal by means of an RFID reader configured to output radio signals in different, restricted spatial directions and to receive response signals from different, restricted spatial directions, said radio signal exciting at least one RFID tag to transmit a response signal;
moving a position determination apparatus carrying the RFID reader to different locations;
transmitting a respective radio signal at at least two different locations and receiving the respective response signal or the respective response signals;
determining, as a simultaneous localization and mapping problem (SLAM problem) with reference to the response signals, a relative position and a relative alignment of the position determination apparatus with respect to the original position and to determine a relative position of the RFID tag using the response signals with respect to the original position by means of a distance of the at least two different locations and by means of the response signals that were excited by the radio signals that were transmitted from the at least two different locations, whereby transmission of a radio signal into a first spatial direction results in excitation of an RFID tag located in the first spatial direction, and receiving response signals from the RFID tag from that spatial direction, and transmission of a radio signal into a second spatial direction results in excitation of an RFID tag located in the second spatial direction, and receiving response signals from the RFID tag from that spatial direction; and
causing the position determination device to move to a next location and determine a subsequent relative position and relative alignment of the position determination apparatus with respect to said next location,
causing the RFID reader to output radio signals in different, restricted spatial directions and receive response signals from different, restricted spatial directions, controlled by a movable antenna or by using a plurality of suitably connected antennas, allowing determination of the direction of the response signal and so as to determine the relative position.

16. The method in accordance with claim 15, further comprising the step of:
carrying out a measurement of the movement of the position determination apparatus by means of a movement determination apparatus.

17. The method in accordance with claim 16,
wherein the measurement of the movement of the position determination apparatus is carried out by means of at least one of a laser scanner and an odometer.

18. The method in accordance with claim 15,
wherein the RFID reader outputs radio signals in different, restricted spatial directions and receives response signals from different, restricted spatial directions by pivoting and/or moving the position determination apparatus.

19. The position determination apparatus in accordance with claim 15, wherein the RFID reader outputs radio signals in different, restricted spatial directions and receives response signals from different, restricted spatial directions by pivoting and/or moving an antenna attached to the position determination apparatus.

\* \* \* \* \*